No. 830,601. PATENTED SEPT. 11, 1906.
H. J. KREBS.
PROCESS OF TREATING SCRAP BRASS.
APPLICATION FILED DEC. 5, 1905.
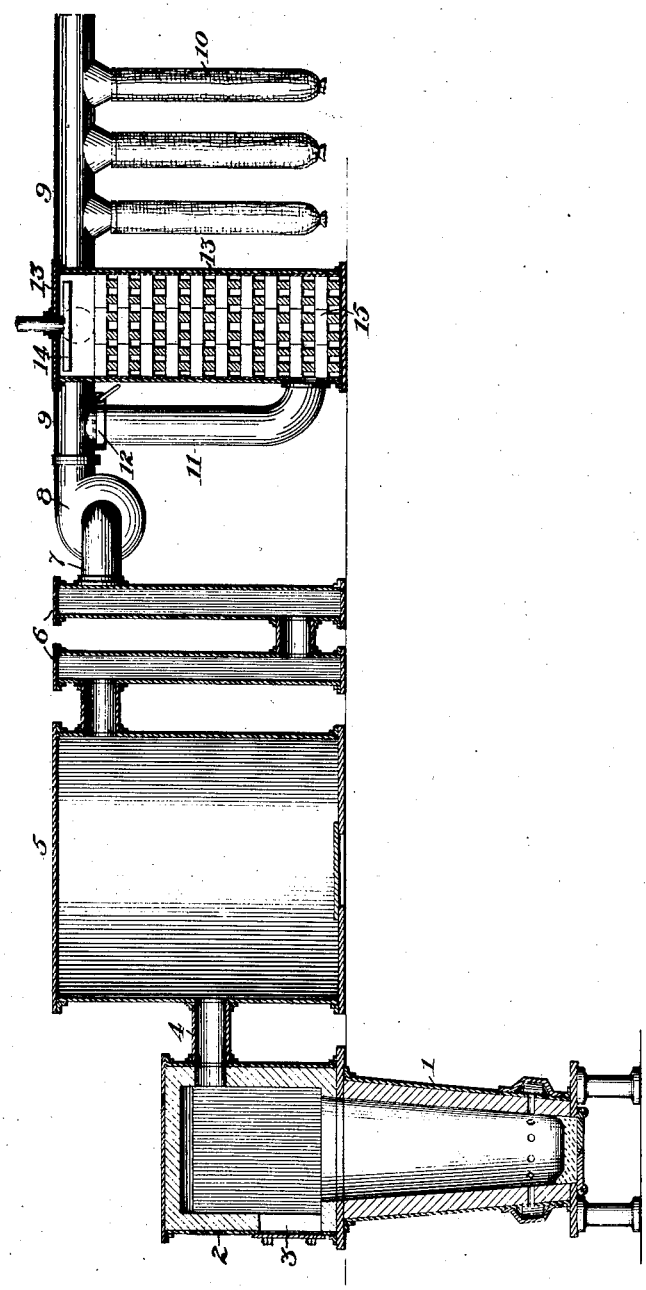
Witnesses:
Inventor:
Henry J. Krebs,

UNITED STATES PATENT OFFICE.

HENRY J. KREBS, OF WILMINGTON, DELAWARE.

PROCESS OF TREATING SCRAP-BRASS.

No. 830,601. Specification of Letters Patent. Patented Sept. 11, 1906.

Application filed December 5, 1905. Serial No. 290,412.

*To all whom it may concern:*

Be it known that I, HENRY J. KREBS, a citizen of the United States, residing at Wilmington, in the county of Newcastle and State of Delaware, have invented certain new and useful Improvements in Processes of Treating Scrap-Brass, of which the following is a specification.

This process is designed for the treatment of waste brass and similar alloys of copper with zinc, lead, tin, and other easily-oxidizable metals and contemplates the recovery of the copper in metallic form and the conversion of the zinc, lead, and tin into oxids.

In carrying out the process the scrap-brass or alloy is melted and subjected to the action of air, preferably in a cupola-furnace, thereby oxidizing the zinc and the lead and tin if present. The oxids escape from the furnace as a fume and may be caught in bags for use as a pigment or may be dissolved in acid to produce salts of the metals.

A suitable apparatus for carrying out the process is shown in the accompanying drawing, in which the figure is a vertical longitudinal section of a cupola-furnace and of the means for cooling and recovering the fume.

The cupola-furnace 1 of any usual or preferred construction opens at its upper end into a chamber 2, having a charging door or doors 3. From this chamber an outlet 4 leads to a separating and cooling system comprising the cylinder 5 and the cooling-sections 6, having connections alternately at their opposite ends. From the last section 6 a pipe 7 leads to the fan 8, which delivers to the conduit 9 and the bags 10. From the conduit 9 a pipe 11, controlled by a rock-valve 12, leads to the lower end of a tower 13, constructed of or lined with acid-proof material and provided at its upper end with spray-pipes 14. The tower is filled with checker-work, quartz pebbles, or other deflecting means 15.

In employing this apparatus to produce a pigment the scrap-brass is melted in the cupola and the air-blast oxidizes the zinc and the lead and tin if present. The oxid fume rises and escapes with the products of combustion through the outlet 4 into the separator 5, wherein the cinders and coarser particles precipitate. The fume passes on through the cooling-sections 6 and is delivered by the fan through the open conduit 9 to the bags 10 or any other usual device for catching the oxid. The purified copper remaining in the cupola-furnace is tapped out and may be cast into ingots or refined in another furnace. If it is desired to convert the zinc or other oxids to salts, the valve 12 is rocked to close the passage to the bags and open the pipe 11. A suitable acid solution is supplied to the pipes 14 and falls through the checker-work in the tower, wherein it is met by the rising fume. The resulting zinc sulfate and other soluble salts may be drawn off through a valved outlet and the lead sulfate and other insoluble residues removed through an opening. (Not shown.) In some cases it may be desirable to simultaneously recover different portions of the oxid fume as a pigment and in the form of an acid salt. This result may be effected by setting the valve 12 so as to deliver the desired percentages to the bags and the acid-tower.

While a cupola-furnace is preferably employed to both melt the brass and oxidize the zinc, the scrap metal may be first melted in a cupola, reverberatory, or crucible furnace and then transferred to a Bessemer converter to effect the oxidation, the converter being provided with the usual twyers for injecting air into the molten metal and with a closed top and an outlet for the fume.

I claim—

1. The process of treating scrap-brass and similar copper alloys, which consists in melting the alloy, converting the easily-oxidizable metals in the alloy into an oxid fume, and recovering the fume and the purified copper, as set forth.

2. The process of treating scrap-brass and similar copper alloys, which consists in melting the alloy, converting the easily-oxidizable metals in the alloy into an oxid fume, cooling the fume, and recovering the fume and the purified copper, as set forth.

3. The process of treating scrap-brass and similar copper alloys, which consists in melting the alloy, converting the easily-oxidizable metals in the alloy into an oxid-fume, separating the coarser particles from the fume, cooling the fume, and recovering the fume and the purified copper, as set forth.

4. The process of treating scrap-brass, which consists in melting the brass in a cupola-furnace and oxidizing the zinc in the molten metal, discharging the oxidation products from the furnace and cooling them, and recovering the zinc oxid and purified copper, as set forth.

5. The process of treating scrap-brass, which consists in melting the brass in a cupola-furnace and oxidizing the zinc in the molten metal, discharging the oxidation products from the furnace, separating the coarser particles and cooling the fume, and recovering the zinc oxid and purified copper, as set forth.

6. The process of treating scrap-brass, which consists in melting the brass in a cupola-furnace and oxidizing the zinc in the molten metal, discharging the oxidation products from the furnace, separating the coarser particles and cooling the fume, collecting the zinc oxid in bags or other suitable receptacles, and discharging the purified copper from the furnace, as set forth.

7. The process of treating scrap-brass, which consists in melting the brass in a cupola-furnace and oxidizing the zinc in the molten metal, discharging the oxidation products from the furnace, separating the coarser particles and cooling the fume, collecting the zinc oxid from one portion of the fume and treating another portion of the fume with an acid solution for the production of a salt, and discharging the purified copper from the furnace, as set forth.

In testimony whereof I affix my signature in presence of two witnesses.

HENRY J. KREBS.

Witnesses:
C. M. GROOME,
A. A. ROBINSON.